US012673691B2

(12) United States Patent
Samples et al.

(10) Patent No.: US 12,673,691 B2
(45) Date of Patent: Jul. 7, 2026

(54) SYSTEMS AND METHODS FOR VALIDATING A LOCALIZATION SYSTEM OF AN AUTONOMOUS VEHICLE

(71) Applicant: Aurora Operations, Inc., Mountain View, CA (US)

(72) Inventors: Michael Samples, Redmond, WA (US); Robert Michael Zlot, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 348 days.

(21) Appl. No.: 18/463,998

(22) Filed: Sep. 8, 2023

(65) Prior Publication Data

US 2025/0083690 A1 Mar. 13, 2025

(51) Int. Cl.
B60W 50/02 (2012.01)
B60W 60/00 (2020.01)
G07C 5/04 (2006.01)

(52) U.S. Cl.
CPC ...... B60W 60/001 (2020.02); B60W 50/0205 (2013.01); G07C 5/04 (2013.01); B60W 2050/0215 (2013.01); B60W 2420/408 (2024.01); B60W 2520/10 (2013.01); B60W 2556/40 (2020.02); B60W 2556/50 (2020.02)

(58) Field of Classification Search
CPC .......... B60W 60/001; B60W 50/0205; B60W 2050/0215; B60W 2420/408; B60W 2520/10; B60W 2556/40; B60W 2556/50; G07C 5/04
See application file for complete search history.

(56) References Cited

U.S. PATENT DOCUMENTS

| | | | |
|---|---|---|---|
| 12,246,734 B1 * | 3/2025 | Jung | B60W 50/0205 |
| 2021/0286925 A1 * | 9/2021 | Wyrwas | G06N 3/084 |

FOREIGN PATENT DOCUMENTS

WO WO2022051263 A1 3/2022

* cited by examiner

*Primary Examiner* — Ramya P Burgess
*Assistant Examiner* — Chanmin Park
(74) *Attorney, Agent, or Firm* — Dority & Manning, P.A.

(57) ABSTRACT

A localization system can be validated by: obtaining log data descriptive of a plurality of environmental and operational conditions associated with operation of the autonomous vehicle in an environment; augmenting the log data with one or more simulated anomalies; simulating operation of the localization system using the augmented data as input; obtaining simulation result data descriptive of a state of the localization system subsequent simulating the operation of the localization system; and determining a metric associated with the localization system based on the simulation result data.

20 Claims, 11 Drawing Sheets

410

RANGE DATA
412

ENCODERS
413

IMU
ACCUMULATOR 414

SENSOR
ALIGNMENT 415

LIDAR
ALIGNMENT 416

LANE
ALIGNMENT 417

MAP
DATA 418

LOCALIZATTION SYSTEM
400

LOCALIZATTION FILTER
402

POSE STATE(S)
420

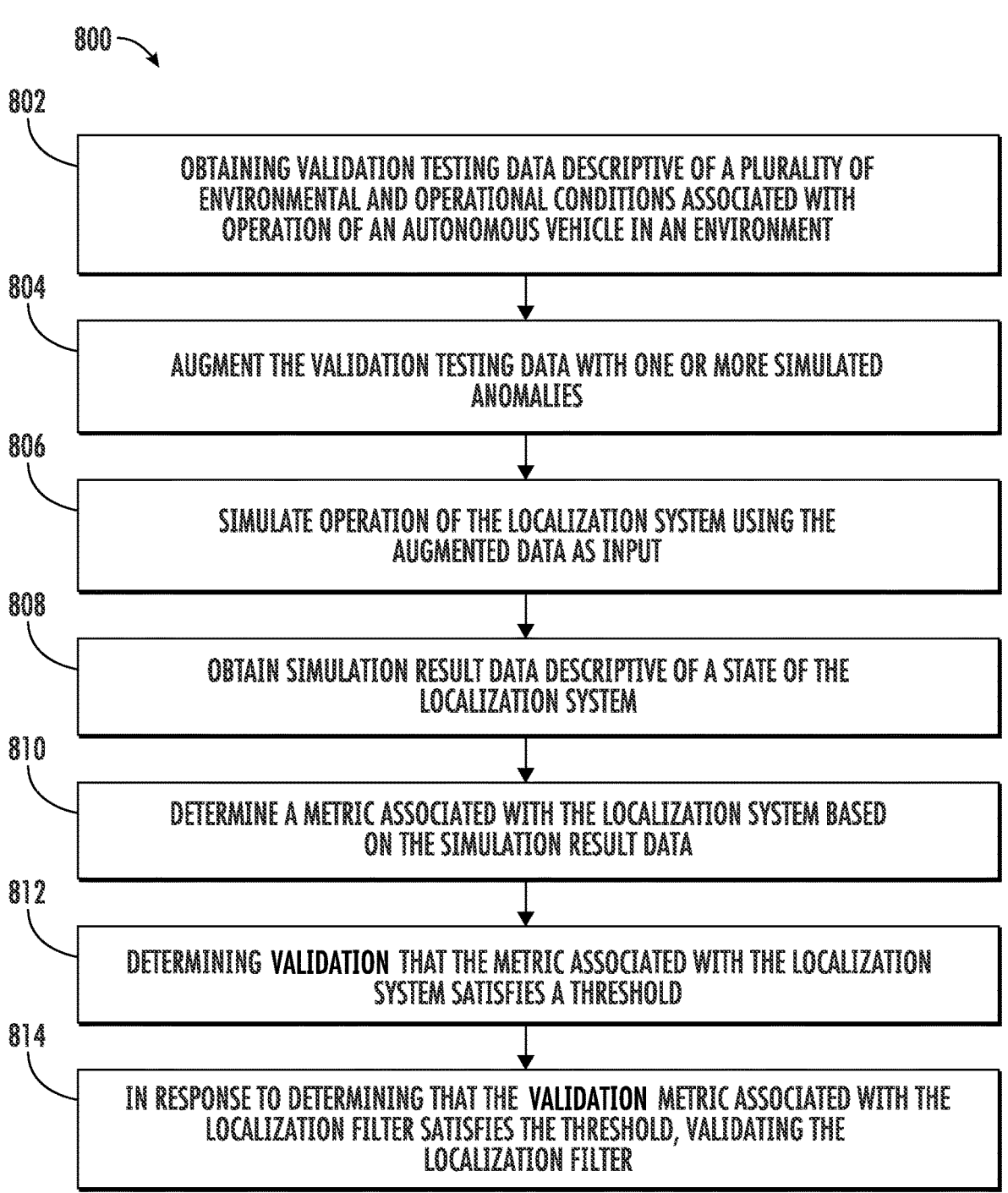

800

802
OBTAINING VALIDATION TESTING DATA DESCRIPTIVE OF A PLURALITY OF ENVIRONMENTAL AND OPERATIONAL CONDITIONS ASSOCIATED WITH OPERATION OF AN AUTONOMOUS VEHICLE IN AN ENVIRONMENT

804
AUGMENT THE VALIDATION TESTING DATA WITH ONE OR MORE SIMULATED ANOMALIES

806
SIMULATE OPERATION OF THE LOCALIZATION SYSTEM USING THE AUGMENTED DATA AS INPUT

808
OBTAIN SIMULATION RESULT DATA DESCRIPTIVE OF A STATE OF THE LOCALIZATION SYSTEM

810
DETERMINE A METRIC ASSOCIATED WITH THE LOCALIZATION SYSTEM BASED ON THE SIMULATION RESULT DATA

812
DETERMINING VALIDATION THAT THE METRIC ASSOCIATED WITH THE LOCALIZATION SYSTEM SATISFIES A THRESHOLD

814
IN RESPONSE TO DETERMINING THAT THE VALIDATION METRIC ASSOCIATED WITH THE LOCALIZATION FILTER SATISFIES THE THRESHOLD, VALIDATING THE LOCALIZATION FILTER

FIG. 8

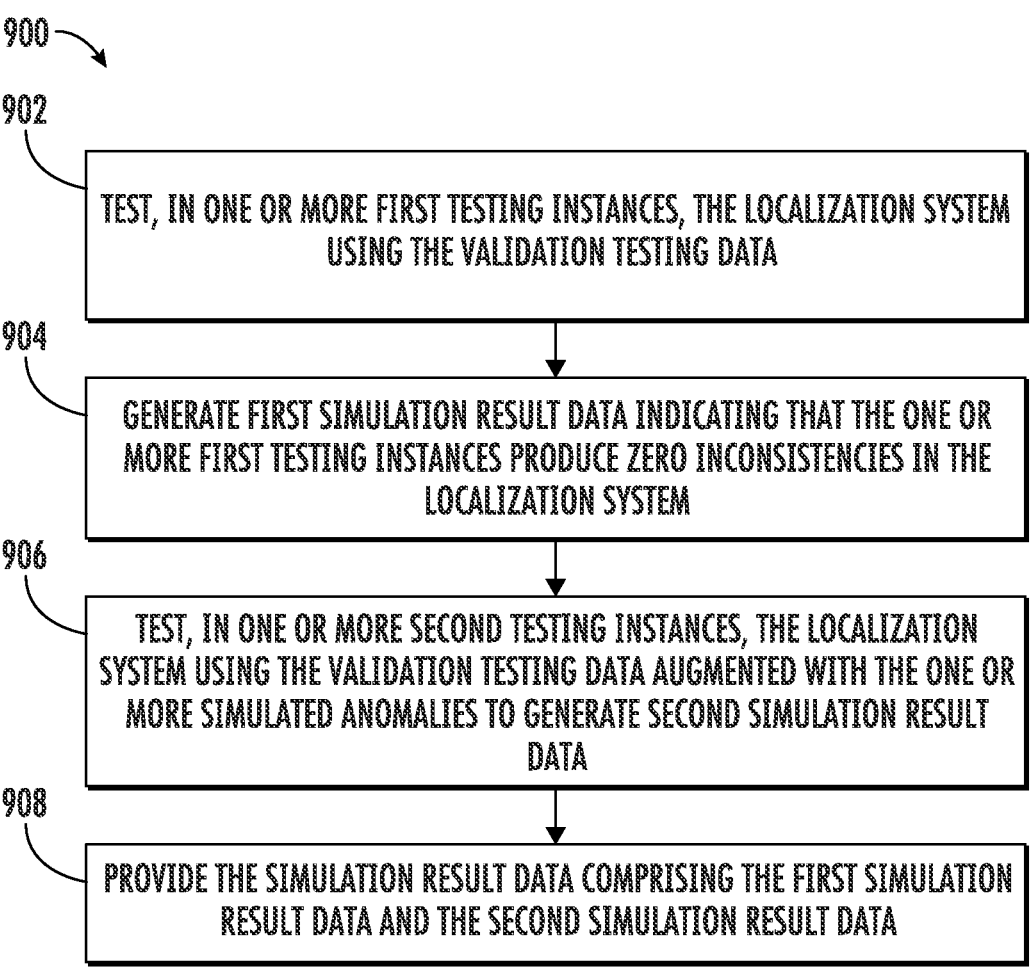

900

902 — TEST, IN ONE OR MORE FIRST TESTING INSTANCES, THE LOCALIZATION SYSTEM USING THE VALIDATION TESTING DATA

904 — GENERATE FIRST SIMULATION RESULT DATA INDICATING THAT THE ONE OR MORE FIRST TESTING INSTANCES PRODUCE ZERO INCONSISTENCIES IN THE LOCALIZATION SYSTEM

906 — TEST, IN ONE OR MORE SECOND TESTING INSTANCES, THE LOCALIZATION SYSTEM USING THE VALIDATION TESTING DATA AUGMENTED WITH THE ONE OR MORE SIMULATED ANOMALIES TO GENERATE SECOND SIMULATION RESULT DATA

908 — PROVIDE THE SIMULATION RESULT DATA COMPRISING THE FIRST SIMULATION RESULT DATA AND THE SECOND SIMULATION RESULT DATA

FIG. 9

SYSTEMS AND METHODS FOR VALIDATING A LOCALIZATION SYSTEM OF AN AUTONOMOUS VEHICLE

BACKGROUND

An autonomous platform can process data to perceive an environment through which the autonomous platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Performance of localization systems for autonomous vehicles has improved dramatically in recent years, especially for test data scenarios depicting typical environmental conditions. For instance, some localization systems can have zero recorded autonomy disengagements over testing datasets sourced from real-world operation of autonomous vehicles, even over datasets with approximately one million miles of driving data. Nonetheless, it can be desirable to validate performance of a localization system in even the most unusual environmental conditions. For instance, it can be desirable to ensure that the localization system is robust to so-called "long-tail" errors which are theoretically possible, although almost statistically impossible to encounter in a real-world driving scenario. Because these conditions are so uncommon, it can be challenging to capture log data depicting these conditions from operating a real-world autonomous vehicle. Systems and methods described herein provide approaches for validating localization systems of an autonomous vehicle.

An example localization system includes a localization filter configured to receive inputs from a variety of sensors and other systems onboard an autonomous vehicle. This can include systems such as RADAR/LIDAR systems, surfel registration systems, lane alignment systems, IMUs, wheel encoders, GNSS, or other systems. The localization filter can receive inputs from these various systems and determine a current position for the autonomous vehicle. A current position can include a global position (e.g., respecting a georeferenced anchor, etc.), also referred to as "global pose," or relative position (e.g., respecting objects in the environment, etc.), also referred to as "local pose." The localization filter can reason about inputs from multiple systems such that the filter may be robust to anomalous data at one or more of its inputs. For instance, the localization filter may be robust to anomalous data from one or more systems in the event of an undesired operating condition.

The localization system can be tested using an offline testing system. The offline testing system can simulate operational conditions for software components of an autonomous vehicle. The offline testing system can provide log data, such as data captured during operation of a real-world autonomous vehicle, to the localization filter or other systems of the autonomous vehicle. For instance, in some implementations, the offline testing system can provide log data representative of outputs of other systems, such as surfel registration systems, lane alignment systems, etc., to the localization filter such that the localization filter is tested directly. As another example, the offline testing system can provide log data representing sensor data, such as LIDAR data, RADAR data, IMU data, encoder data, etc. to other systems or the localization filter, such that the system as a whole can be tested in an end-to-end manner.

As yet another example, the offline testing system can test the localization system in an end-to-end manner by artificially degrading or disabling operation of various systems throughout the testing process. For instance, the offline testing system can inject noise, disruption, or other degradations into some input data for the localization filter to simulate anomalous conditions at a system and test how robust the localization filter is to degraded operation of other systems. As another example, the offline testing system can manipulate map data provided to the localization filter, such as providing out-of-date data, data from the wrong season or weather conditions, etc. In this way, the offline testing system can augment actual log data with simulated log data depicting more extreme or unusual conditions, which can provide for testing of statistically improbable scenarios.

The offline testing system can produce simulation result data descriptive of states of the localization system during testing.

The offline testing system can determine a metric associated with the localization system based on the simulation result data. For instance, the offline testing system can determine a metric associated with the localization filter. The metric can be indicative of whether the localization system localized the autonomous vehicle with a threshold confidence. The metric associated with the localization filter can be based on metrics of other independent systems in the localization system. For instance, the metric associated with the localization filter can be a combination of stochastic or statistical metrics associated with subsystems of the localization filter, such as inputs, output checkers, or other systems. As one example, an overall anomaly rate of the localization system can be determined based on anomaly rates associated with inputs to the localization filter, an anomaly rate of the localization filter itself, and an anomaly rate of output checkers associated with the inputs and the localization filter. An anomaly may occur, for example, in the event the localization system does not localize the associated autonomous vehicle, does not localize the autonomous vehicle within a threshold confidence. Additionally, or alternatively, an anomaly may occur in cases where a system (e.g., a subsystem of the vehicle, localization system) fails to produce an output or produces an output with an insufficiently high confidence.

As another example, in some implementations, the offline testing system can determine a metric for the localization filter by decomposing an overall metric based on the modularity of the localization system. For instance, the offline testing system can attribute anomalies to certain modules and determine whether the localization filter properly handled the anomalies.

As another example, in some implementations, the offline testing system can determine a metric for the localization filter through statistical correlations learned through the simulation of localization scenarios. For instance, empirical studies of the localization filter can reveal statistical correlations among aspects of the localization filter, such as inputs and filter variables. A model of the localization filter can be generated based on these statistical correlations and used to evaluate performance of the localization filter. The offline testing system can thus validate the localization system by ensuring that the metric satisfies a certain threshold associated with robust operations.

Systems and methods according to example aspects of the present disclosure can provide a number of technical effects and benefits. As one example, systems and methods according to example aspects of the present disclosure can provide for improved accuracy or robustness of a localization system. Additionally or alternatively, systems and methods described herein can reduce costs associated with sourcing log data, such as computational load costs associated with sourcing large volumes of log data or log data depicting abnormal or rare environmental conditions. The increased availability of log data can provide for improved robustness of validated localization systems.

For example, in an aspect, the present disclosure provides for a computer-implemented method for validating a localization system of an autonomous vehicle. The computer-implemented method includes obtaining log data descriptive of a plurality of environmental and operational conditions associated with operation of the autonomous vehicle in an environment. The computer-implemented method includes augmenting the log data with one or more simulated anomalies. The computer-implemented method includes simulating operation of the localization system using the augmented data as input. The computer-implemented method includes obtaining simulation result data descriptive of a state of the localization system subsequent to simulating operation of the localization system using the augmented data as input. The computer-implemented method includes determining a metric associated with the localization system based on the simulation result data.

In some implementations, the log data includes localization result data descriptive of an output or state of the localization system during operation of the autonomous vehicle in the environment.

In some implementations, determining the metric associated with the localization system is based on a comparison between the localization result data and the simulation result data.

In some implementations, simulating operation of the autonomous vehicle using the augmented data as input includes dropping one or more inputs to the localization system. In some implementations, the one or more inputs include outputs of one or more of a lane alignment system, a surfel registration system, a sensor velocity system, an IMU, one or more wheel encoders, a GNSS, a RADAR system, or a LIDAR system.

In some implementations, simulating operation of the autonomous vehicle using the augmented data as input includes degrading one or more inputs to the localization system. In some implementations, degrading one or more inputs to the localization system includes at least one of: (i) disabling outputs of one or more sensors in a sensor system; (ii) utilizing one or more incorrect calibrations on a sensor; (iii) simulating one or more occlusions; (iv) simulating latency at the one or more inputs; (v) simulating one or more boundary conditions; or (vi) injecting a checkpoint fault.

In some implementations, simulating operation of the autonomous vehicle using the augmented data as input includes augmenting map data provided to the localization system. In some implementations, the augmented map data includes one or more of out-of-date map data, map data representing new construction or vegetation, misaligned map data, map data including missing surfel registrations, or map data depicting inaccurate travelway regions.

In some implementations, the simulation result data is descriptive of one or more anomalous outputs of the localization filter.

In some implementations, determining the metric associated with the localization system includes: determining one or more subsystem metrics associated with one or more subsystems of the localization system; and determining the metric associated with the localization filter based on the one or more subsystem metrics.

In some implementations, the metric is indicative of whether the localization system localized the autonomous vehicle with a threshold confidence.

In some implementations, the method further includes determining that the metric associated with the localization filter satisfies a threshold. In some implementations, the method further includes, in response to determining that the metric associated with the localization filter satisfies the threshold, validating the localization filter.

For example, in an aspect, the present disclosure provides for an autonomous vehicle control system. The autonomous vehicle control system includes one or more processors and one or more non-transitory, computer-readable media storing instructions that cause the one or more processors to perform operations. The operations include obtaining log data descriptive of a plurality of environmental and operational conditions associated with operation of the autonomous vehicle in an environment. The operations include augmenting the log data with one or more simulated anomalies. The operations include simulating operation of the localization system using the augmented data as input. The operations include obtaining simulation result data descriptive of a state of the localization system subsequent to simulating operation of the localization system using the augmented data as input. The operations include determining a metric associated with the localization system based on the simulation result data.

In some implementations, the log data includes localization result data descriptive of an output or state of the localization system during operation of the autonomous vehicle in the environment.

In some implementations, determining the metric associated with the localization system is based on a comparison between the localization result data and the simulation result data.

In some implementations, simulating operation of the autonomous vehicle using the augmented data as input includes dropping one or more inputs to the localization system. In some implementations, the one or more inputs include one or more of a lane alignment system, a surfel registration system, a sensor velocity system, an IMU, one or more wheel encoders, a GNSS, a RADAR system, or a LIDAR system.

In some implementations, simulating operation of the autonomous vehicle using the augmented data as input includes degrading one or more inputs to the localization system. In some implementations, degrading one or more inputs to the localization system includes at least one of: (i) disabling outputs of one or more sensors in a sensor system; (ii) utilizing one or more incorrect calibrations on a sensor; (iii) simulating one or more occlusions; (iv) simulating latency at the one or more inputs; (v) simulating one or more boundary conditions; or (vi) injecting a checkpoint fault.

In some implementations, simulating operation of the autonomous vehicle using the augmented data as input includes augmenting map data provided to the localization system. In some implementations, the augmented map data includes one or more of out-of-date map data, map data representing new construction or vegetation, misaligned map data, map data including missing surfel registrations, or map data depicting inaccurate travelway regions.

In some implementations, the simulation result data is descriptive of one or more anomalous outputs of the localization filter.

In some implementations, determining the metric associated with the localization system includes: determining one or more subsystem metrics associated with one or more subsystems of the localization system; and determining the metric associated with the localization filter based on the one or more subsystem metrics.

In some implementations, the metric is indicative of whether the localization system localized the autonomous vehicle with a threshold confidence.

In some implementations, the method further includes determining that the metric associated with the localization filter satisfies a threshold. In some implementations, the method further includes, in response to determining that the metric associated with the localization filter satisfies the threshold, validating the localization filter.

For example, in an aspect, the present disclosure provides for an autonomous vehicle. The autonomous vehicle includes one or more processors and one or more non-transitory, computer-readable media storing instructions that cause the one or more processors to perform operations. The operations include obtaining log data descriptive of a plurality of environmental and operational conditions associated with operation of the autonomous vehicle in an environment. The operations include augmenting the log data with one or more simulated anomalies. The operations include simulating operation of the localization system using the augmented data as input. The operations include obtaining simulation result data descriptive of a state of the localization system subsequent to simulating operation of the localization system using the augmented data as input. The operations include determining a metric associated with the localization system based on the simulation result data.

In some implementations, the log data includes localization result data descriptive of an output or state of the localization system during operation of the autonomous vehicle in the environment.

In some implementations, determining the metric associated with the localization system is based on a comparison between the localization result data and the simulation result data.

In some implementations, simulating operation of the autonomous vehicle using the augmented data as input includes dropping one or more inputs to the localization system. In some implementations, the one or more inputs include one or more of a lane alignment system, a surfel registration system, a sensor velocity system, an IMU, one or more wheel encoders, a GNSS, a RADAR system, or a LIDAR system.

In some implementations, simulating operation of the autonomous vehicle using the augmented data as input includes degrading one or more inputs to the localization system. In some implementations, degrading one or more inputs to the localization system includes at least one of: (i) disabling outputs of one or more sensors in a sensor system; (ii) utilizing one or more incorrect calibrations on a sensor; (iii) simulating one or more occlusions; (iv) simulating latency at the one or more inputs; (v) simulating one or more boundary conditions; or (vi) injecting a checkpoint fault.

In some implementations, simulating operation of the autonomous vehicle using the augmented data as input includes augmenting map data provided to the localization system. In some implementations, the augmented map data includes one or more of out-of-date map data, map data representing new construction or vegetation, misaligned map data, map data including missing surfel registrations, or map data depicting inaccurate travelway regions.

In some implementations, the simulation result data is descriptive of one or more anomalous outputs of the localization filter.

In some implementations, determining the metric associated with the localization system includes: determining one or more subsystem metrics associated with one or more subsystems of the localization system; and determining the metric associated with the localization filter based on the one or more subsystem metrics.

In some implementations, the metric is indicative of whether the localization system localized the autonomous vehicle with a threshold confidence.

In some implementations, the method further includes determining that the metric associated with the localization filter satisfies a threshold. In some implementations, the method further includes, in response to determining that the metric associated with the localization filter satisfies the threshold, validating the localization filter.

Other example aspects of the present disclosure are directed to other systems, methods, vehicles, apparatuses, tangible non-transitory computer-readable media, and devices for localizing and validating localization systems of an autonomous vehicle.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

FIG. 8 is a flowchart of an example method for validating a localization system of an autonomous vehicle, according to some implementations of the present disclosure;

FIG. 9 is a flowchart of an example method for validating a localization system of an autonomous vehicle, according to some implementations of the present disclosure.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems. As used herein, "about" in conjunction with a stated numerical value is intended to refer to within 20 percent of the stated numerical value, except where otherwise indicated.

Figure 1:
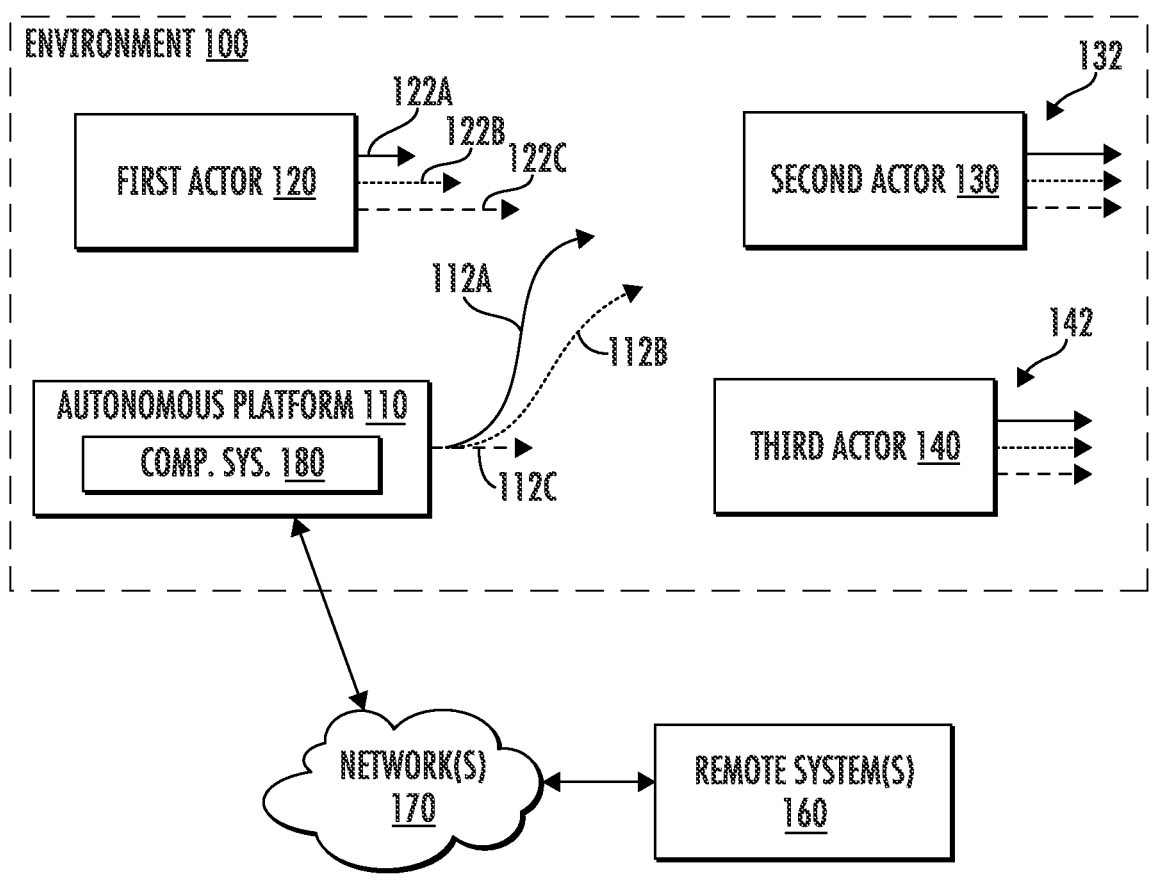
FIG. 1 is a block diagram of an example operational scenario, according to some implementations of the present disclosure.

With reference to FIGS. 1-10, example embodiments of the present disclosure are discussed in further detail. FIG. 1 is a block diagram of an example operational scenario according to example implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 can be or include an indoor environment (e.g., within one or more facilities, etc.) or an outdoor environment. An indoor environment, for example, can be an environment enclosed by a structure such as a building (e.g., a service depot, maintenance location, manufacturing facility, etc.). An outdoor environment, for example, can be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 can be any type of platform configured to operate within the environment 100. For example, the autonomous platform 110 can be a vehicle configured to autonomously perceive and operate within the environment 100. The vehicles can be a ground-based autonomous vehicle such as, for example, an autonomous car, truck, van, etc. The autonomous platform 110 can be an autonomous vehicle that can control, be connected to, or be otherwise associated with implements, attachments, or accessories for transporting people or cargo. This can include, for example, an autonomous tractor optionally coupled to a cargo trailer. Additionally or alternatively, the autonomous platform 110 can be any other type of vehicle such as one or more aerial vehicles, water-based vehicles, space-based vehicles, other ground-based vehicles, etc.

The autonomous platform 110 can be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) can be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s). In particular, according to example aspects of the present disclosure, the autonomous platform 110 can localize itself with respect to the environment 100 or with respect to the object(s) in the environment 100.

Figure 2:
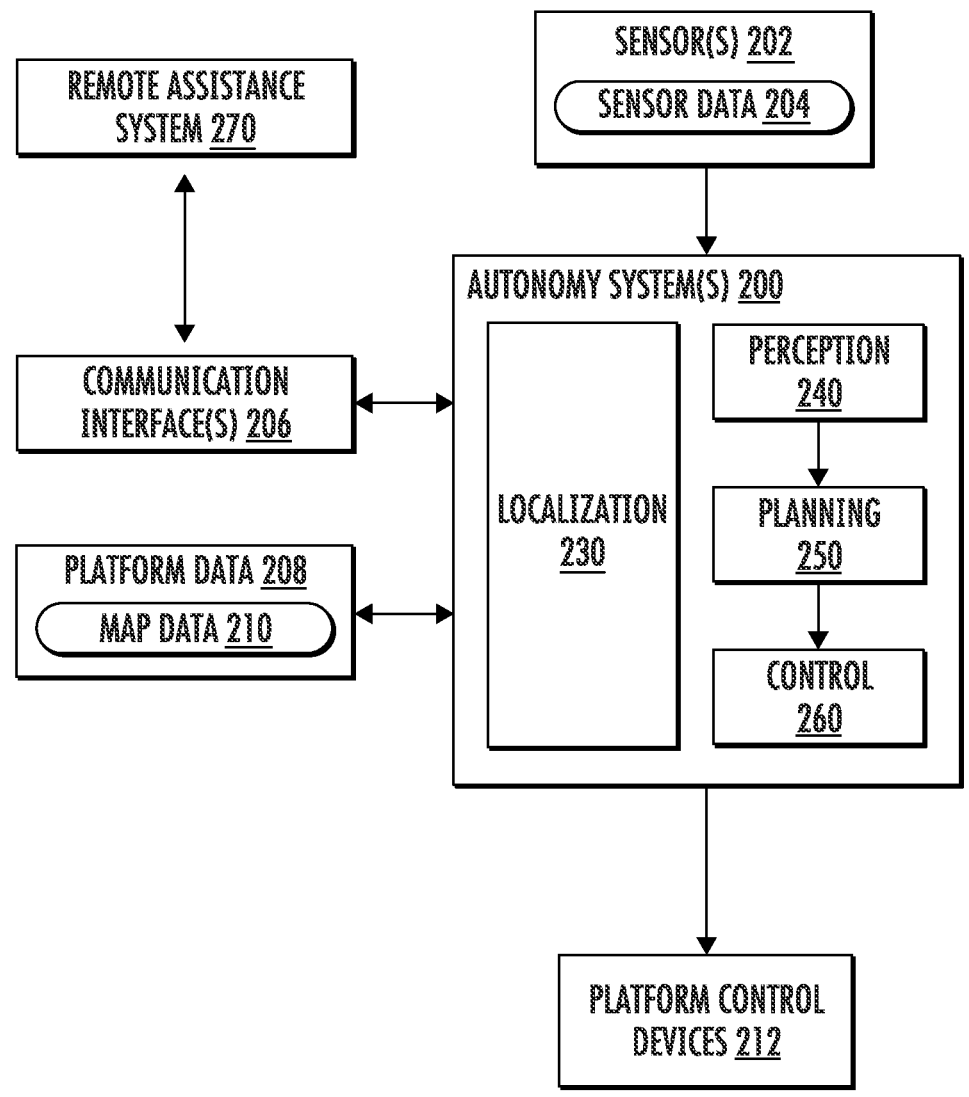
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 can include different subsystems for performing various autonomy operations. The subsystems can include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment can be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors 202, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230 (e.g., a pose estimation system), which can provide an autonomous platform with an understanding of its location and orientation in an environment (its "pose"). In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.), also referred to as "global pose," or relative position (e.g., respecting objects in the environment, etc.), also referred to as "local pose." The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system (e.g., GNSS, GLONASS, GPS, etc.), radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation;

size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy can be a set of discrete decisions (e.g., yield to actor, reverse yield to actor, merge, lane change) that the autonomous platform makes. The strategy can be selected from a plurality of potential strategies. The selected strategy can be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger can be an alert, an error signal, a map feature, a request, a location, a traffic condition, a road condition, etc.

After initiating the session, the autonomy system 200 can provide context data to the remote assistance system 270. The context data can include sensor data 204 and state data of the autonomous platform. For example, the context data can include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
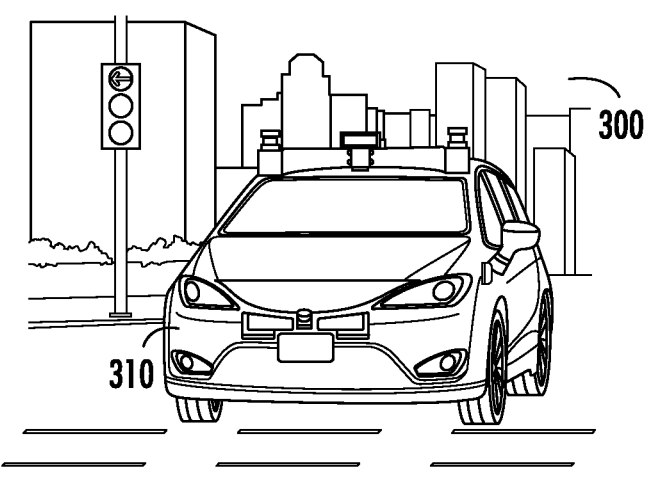
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
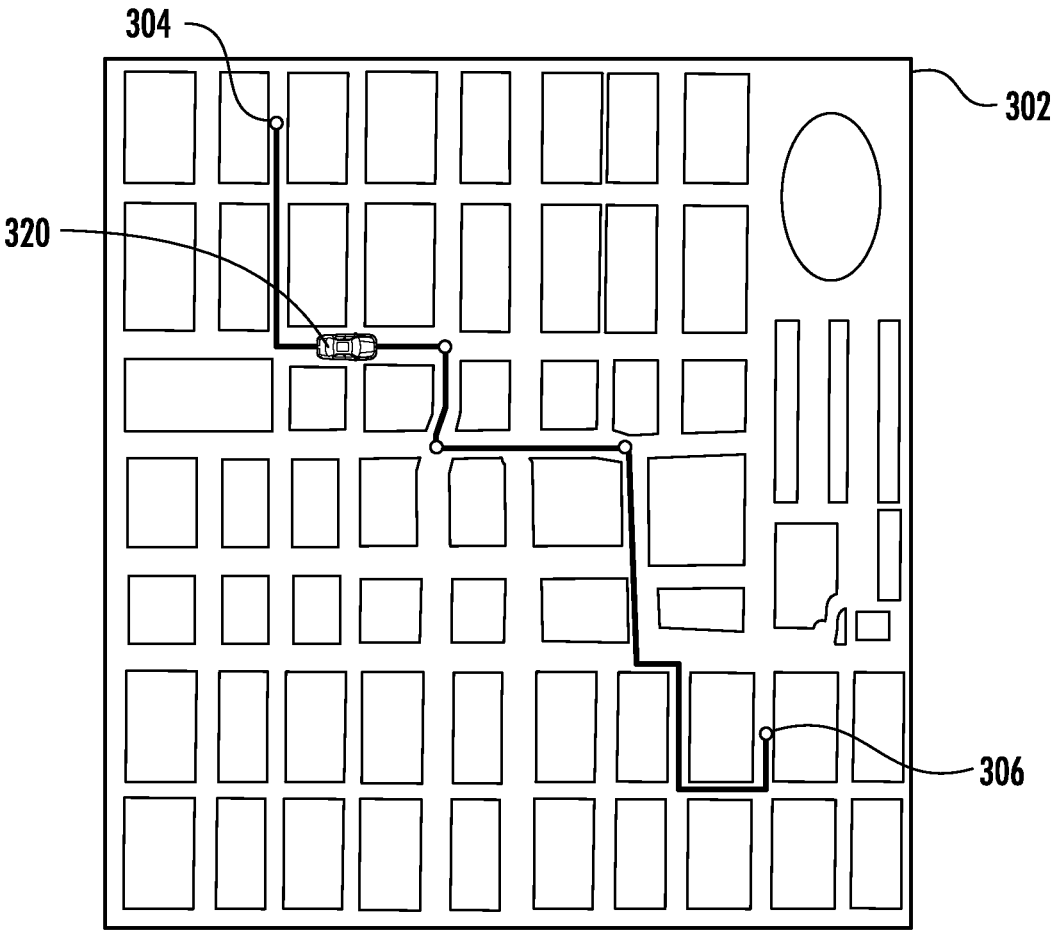
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
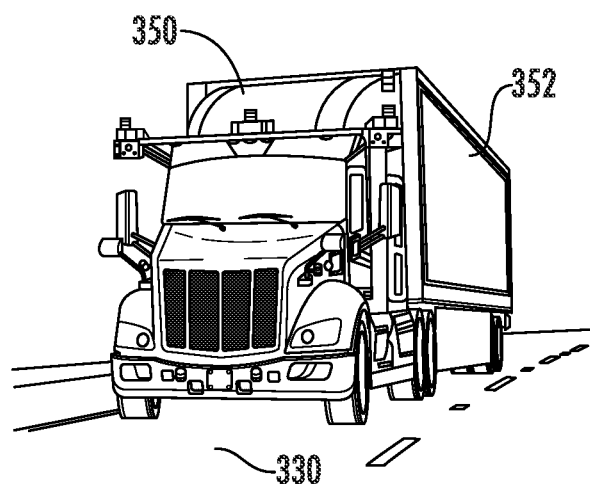
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
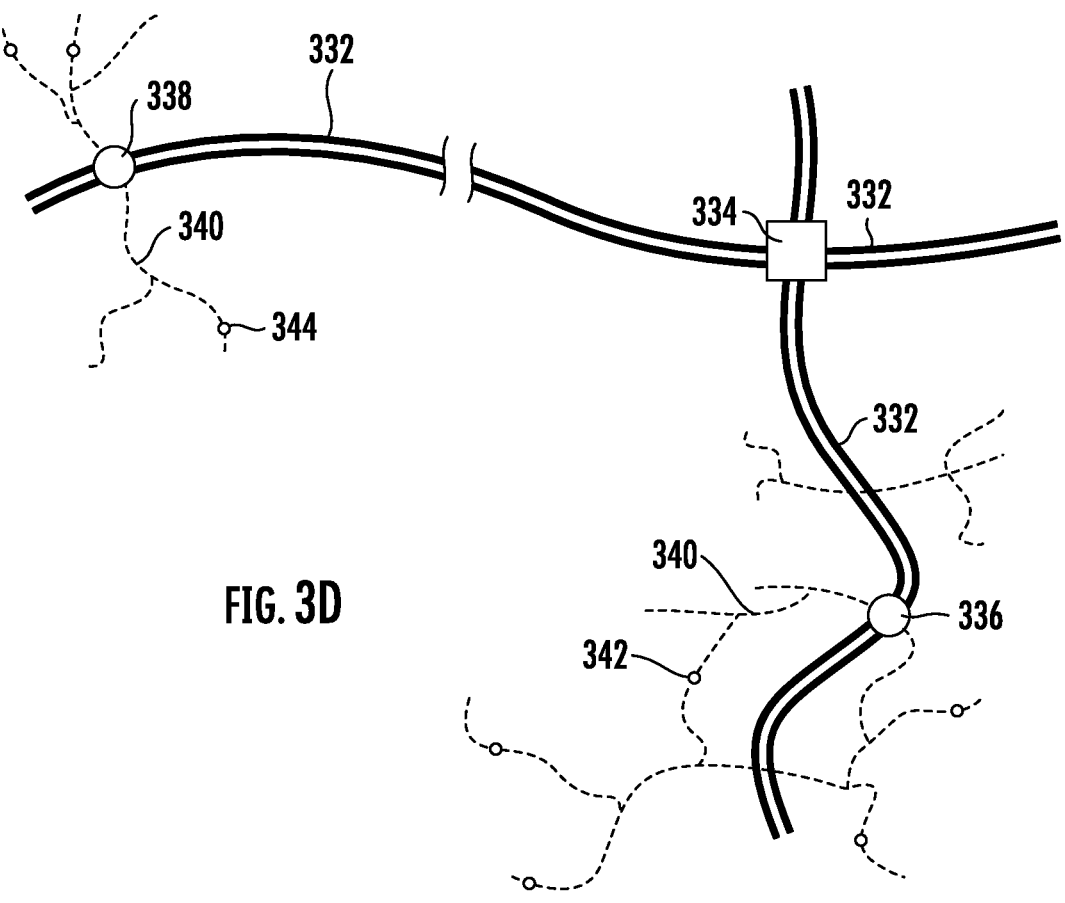
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To help improve the performance of an autonomous platform, such as an autonomous vehicle controlled at least in part using autonomy system(s) 200 (e.g., the autonomous vehicles 310 or 350), systems and methods according to example aspects of the present disclosure can provide for improved localization of an autonomous platform within its environment. In particular, an autonomous platform can employ a pose estimation system having a localization filter. The localization filter can provide for the pose estimation system to reason about the pose of the autonomous platform from multiple sensor inputs or other sources of input. This can provide for improved localization accuracy or more robust outputs from the localization system. The systems and methods of the present disclosure can allow for validation of the localization system to further improve its accuracy and performance across a wide range of operating conditions.

The following figures include systems (e.g., localization systems) with reference numbers that may be different than those appearing in other figures. It should be understood that such systems may be the same as or similar to systems presented and discussed with reference to other figures.

Figure 4:
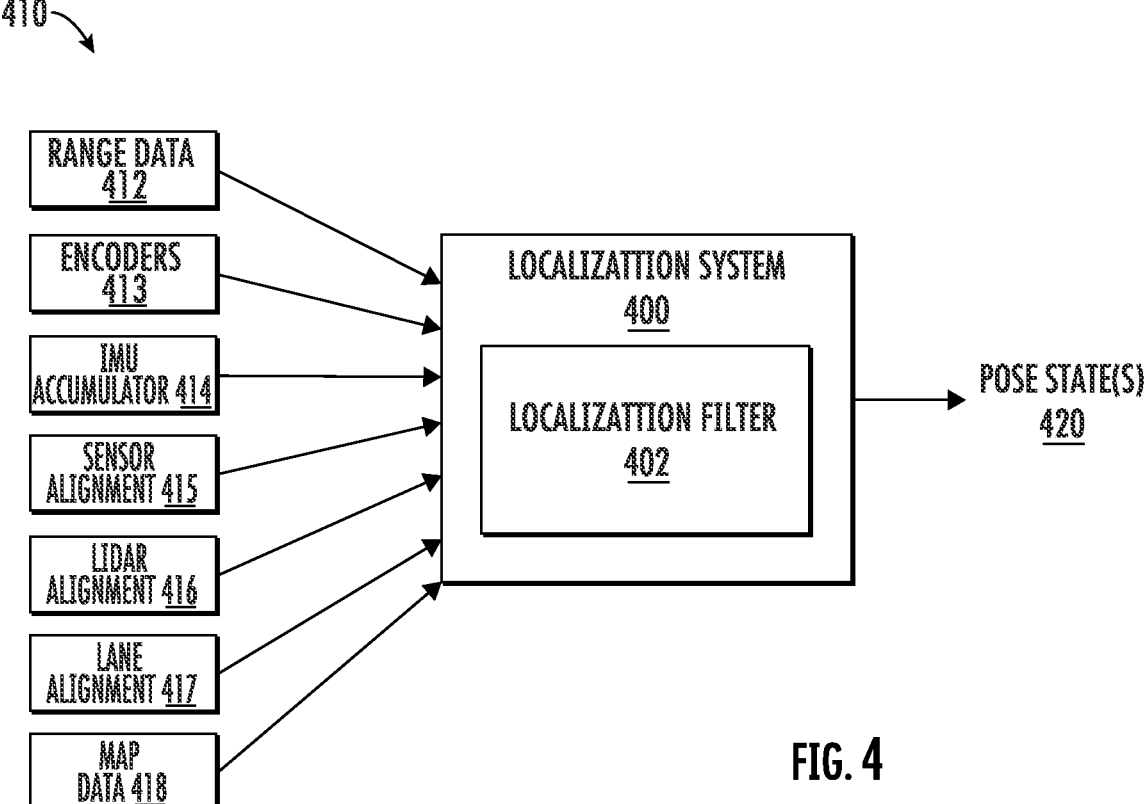
FIG. 4 is a block diagram of an example localization system, according to some implementations of the present disclosure.

FIG. 4 is a block diagram of a localization system 400, according to some implementations of the present disclosure. The localization system 400 can produce pose states 420.

In particular, the localization system 400 can employ a localization filter 402. One example of a localization filter 402 is a Kalman filter. A Kalman filter, or linear quadratic estimation filter, is an algorithm utilizing a series of measurements over time (which can include noise, biases, or other inaccuracies) to produce estimates of other, unknown variables. The Kalman filter can estimate a joint probability distribution over the variables at each time frame. The Kalman filter can employ a two-phase prediction process, in which the filter produces initial estimates of current state variables and uncertainties, then updates these estimates with a weighted average after the next measurement is observed. The use of a Kalman filter can provide for processing several measurements in real time, which is beneficial for autonomous platform navigation tasks.

In some implementations, the localization filter 402 can be or can include one or more parallel filters. For instance, in some implementations, the localization filter 402 can include a local pose filter configured to output a local pose estimate or a global pose filter configured to output a global pose estimate. The use of parallel filters can improve the insulation of the local pose state. Additionally or alternatively, the localization filter 402 can be or can include a combined filter. For instance, in some implementations, the localization filter 402 can be a single filter configured to output pose states 420 including both local pose and global pose. The use of a combined filter can provide an improved sensor fusion framework, along with improvements to computing technology such as reduced computational requirements or reduced memory resources dedicated to recording data.

The localization filter 402 can consume inputs 410 from a plurality of sensor systems or other onboard systems on an autonomous vehicle (e.g., autonomous vehicle 310) to produce the pose states 420. The inputs 410 can include any suitable inputs from any suitable systems onboard or in communication with an autonomy system (e.g., autonomy system 200) such as, for example, range data 412 (e.g., from a LIDAR system or RADAR system), encoder inputs 413 (e.g., from wheel encoders), an IMU accumulator input 414 (e.g., from an IMU accumulator system), sensor alignment data 415, LIDAR alignment data 416 (e.g., from a LIDAR alignment tracking module), lane alignment data 417 (e.g., from a lane alignment tracking module), or map data 418, such as one or more map tiles (e.g., from a map data server, a global navigation satellite system (GNSS), etc.).

The pose states 420 can include at least a local pose. As used herein, a "local pose" can be defined relative to an initial position of the autonomous vehicle. Additionally or alternatively, the pose states 420 can include a global pose. The global pose can be defined relative to a global metric. As one example, the global pose can be defined relative to one or more coordinates. As another example, the global pose can be defined relative to a tiled global map. The tiled global map can include map data defined relative to one or more "map tiles" or simply "tiles" that encompass sections of the overall map. For instance, a larger map or atlas can be segmented into a plurality of map tiles that each cover a subset of the larger map or atlas. In this way, analysis of objects on a global map can be focused on objects that are within a proximate frame of reference. Global pose can be used to place map content into the local or vehicle frame.

In the example of FIG. 4, the localization filter 402 accepts inputs 410 from a variety of sensors (e.g., IMUs, encoders, and GNSS) and performs a loosely-coupled filter update with state estimates from various modules, such as a lane alignment module or a surfel registration module, which may generate lane alignment data 417 and LIDAR alignment data 416. In some implementations, the localization filter 402 may be designed so that not all the inputs 410 are equally critical to the operation of the filter 402 at all times. As an example, lane detection may help to cover brief outages in the surfel registration module. Although the modules may not necessarily knowingly produce an anomalous output, the filter 402 can employ gating to reject inputs 410 which are inconsistent with its internal state. If too many inputs are missing or outside a confidence interval, the localization system 400 can detect internal anomalies and trigger a response. It can be desirable to reduce the occurrence of these responses, but can be more desirable to reduce instances where incorrect data is published with high confidence.

Example aspects of the present disclosure provide for an offline testing system capable of offline scenario execution and metrics analysis for snippets of log data for validating localization systems such as the localization system 400. The offline testing system can operate on log data. The log data can include data recorded from prior trips of an autonomous platform or other real-world datasets. Systems and methods according to the present disclosure can augment the testing data to represent conditions that were never or very rarely observed in the real world. For example, in some implementations, one or more of the inputs 410 and combinations thereof can be dropped out or temporarily disabled. As another example, in some implementations, systems and methods described herein can degrade data from the inputs 410 by emulating sensor loss or other degradation. As one example, surfel registration may be performed with only one operational LIDAR system. As another example, lane alignment may be performed with only one operational LIDAR system. As another example, satellite positioning systems may simulate positioning with fewer than typical satellites. As another example, incorrect calibrations may be applied to various inputs 410. As another example, occlusions may be simulated in LIDAR data. As another example, latency may be added to various inputs 410. As another example, faults may be injected into various inputs 410. As another example, map data 418 can be degraded, such as by using outdated map tiles, injecting changes for construction or vegetation, tile misalignment, missing surfel coverage, incorrect road regions, etc.

Figure 5:
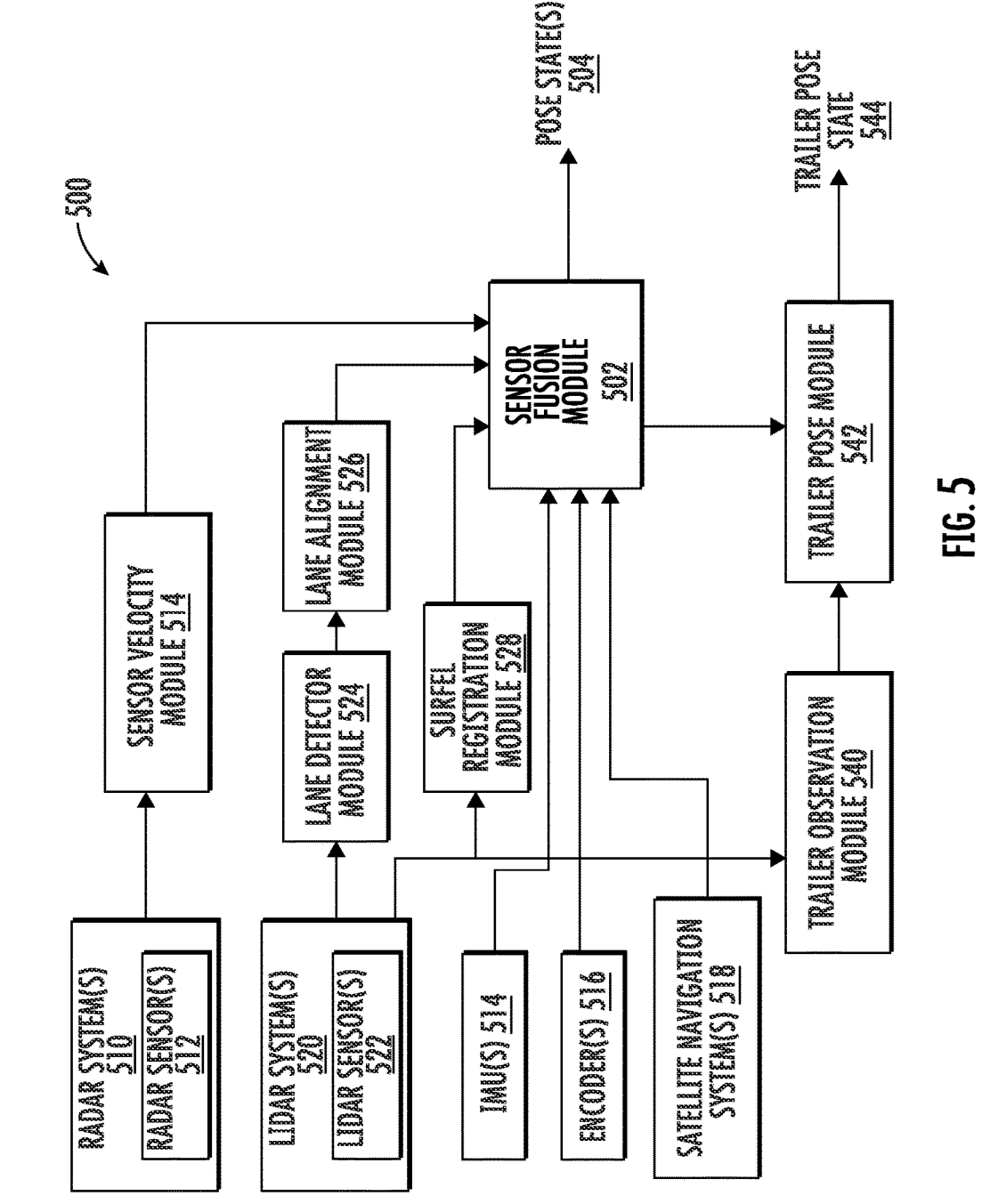
FIG. 5 is a block diagram of an example portion of an autonomous vehicle control system, according to some implementations of the present disclosure.

FIG. 5 is a block diagram of a portion of an autonomous vehicle control system 500, according to some implementations of the present disclosure. In particular, FIG. 5 depicts inputs and outputs of a localization system 502 according to example aspects of the present disclosure. The localization system 502 can be, for example, localization system 400 of FIG. 4. The localization system 502 can employ a localization filter to produce a local pose state 504 and/or a global pose state 506, as described herein.

The system 500 can include one or more RADAR systems 510. Each RADAR system 510 can include one or more RADAR sensors 512. The RADAR systems 510 or RADAR sensors 512 can be positioned onboard an autonomous platform, such as an autonomous vehicle. For instance, each RADAR system 510 can have a field of view that covers a portion of an autonomous vehicle's environment. In some implementations, the RADAR system 510 can be or include Doppler RADARs.

The RADAR system(s) 510 or RADAR sensor(s) 512 can be associated with a sensor velocity module 514. The sensor velocity module 514 can be configured to estimate the velocity of the RADAR system 510 based on RADAR data from the RADAR sensors 512. The velocity can be estimated with respect to the local frame.

In some implementations, a common velocity, common to each RADAR sensor 512, can be estimated for each RADAR system 510. For instance, a velocity may be estimated for a single RADAR sensor 512 and applied to each of the other RADAR sensor(s) 512, rather than computing a unique velocity for each RADAR sensor 512.

Additionally or alternatively, the system 500 can include one or more LIDAR systems 520. Each LIDAR system 520 can include one or more LIDAR sensors 522. The LIDAR systems 520 or LIDAR sensors 522 can be positioned onboard an autonomous platform, such as an autonomous vehicle. For instance, each LIDAR system 520 can have a field of view that covers a portion of an autonomous vehicle's environment.

The system 500 can also include one or more modules to extract geographic or other identifiers from the LIDAR data produced by the LIDAR system(s) 520. As one example, the system 500 can include a lane detector module 524. The lane detector module 524 can analyze the LIDAR data to detect and orient lane boundaries in the environment of the autonomous platform that are visible in the LIDAR data. The detected lanes can be passed to a lane alignment module 526. The lane alignment module 526 can align the detected lanes with respect to a sensor frame, such as the vehicle.

Additionally or alternatively, the system 500 can include a surfel registration module 528. As used here, a "surfel," or surface element, is a representative point surface, typically associated with color, lighting, texture, or other surface information, used to model a larger, more complex surface. The surfel registration module 528 can match LIDAR data from the LIDAR system(s) 520 to known surfels on a larger surfel map. For instance, the surfel registration module 528 can reconcile multiple views of LIDAR data in a consistent frame of reference based on the pose states of the autonomous vehicle and the distance between the autonomous vehicle and consistent features in the multiple views of LIDAR data.

Additionally or alternatively, the system 500 can include one or more inertial measurement units (IMUs) 514. The IMUs 514 can include accelerometers, gyroscopes, magnetometers, compasses, etc. to measure orientation, specific force, angular rate, or other motion characteristics of the autonomous platform. The IMUs 514 can output IMU data. In some implementations, an IMU accumulator can be included to accumulate data from the IMUs 514 over time and generate a persistent orientation measurement based on transient signals from the IMUs 514.

Additionally or alternatively, the system 500 can include one or more wheel encoders 516. The wheel encoders 516 can generate encoder data descriptive of revolutions of wheels on the autonomous platform. For instance, the wheel encoders 516 can convey a number of revolutions (or partial revolutions) of wheels on the autonomous vehicle.

The system 500 can also communicate with one or more satellite navigation systems 518. The satellite navigation system(s) 518 can utilize one or more orbital satellites to provide geospatial positioning. Example satellite navigation systems 518 include global navigation satellite systems such as the Global Positioning System (GPS), GLONASS, Galileo, and BeiDou. Any suitable satellite navigation system can be employed in accordance with the present disclosure.

In some implementations, the system 500 can desirably provide a trailer pose state 544 descriptive of a pose of a trailer coupled to an autonomous platform, such as a trailer of an autonomous truck. In some implementations, this functionality can be built directly into localization system 502. Alternatively, in some implementations, the system 500 can include a trailer pose module 542 to produce the trailer pose state 544. The trailer pose module 542 can consume observations from a trailer observation module 540 configured to provide observations of the trailer. For instance, in some implementations, the trailer pose module 542 can fit a trailer plane to LIDAR point data of the ranging input, extracted by the trailer observation module 540, to estimate the trailer pose states 544. For instance, when a trailer is captured in LIDAR point data, the point data corresponding to the trailer can generally resemble a plane positioned at a sidewall of the trailer. The trailer pose state 544 can be determined based on the orientation of the plane.

Figure 6:
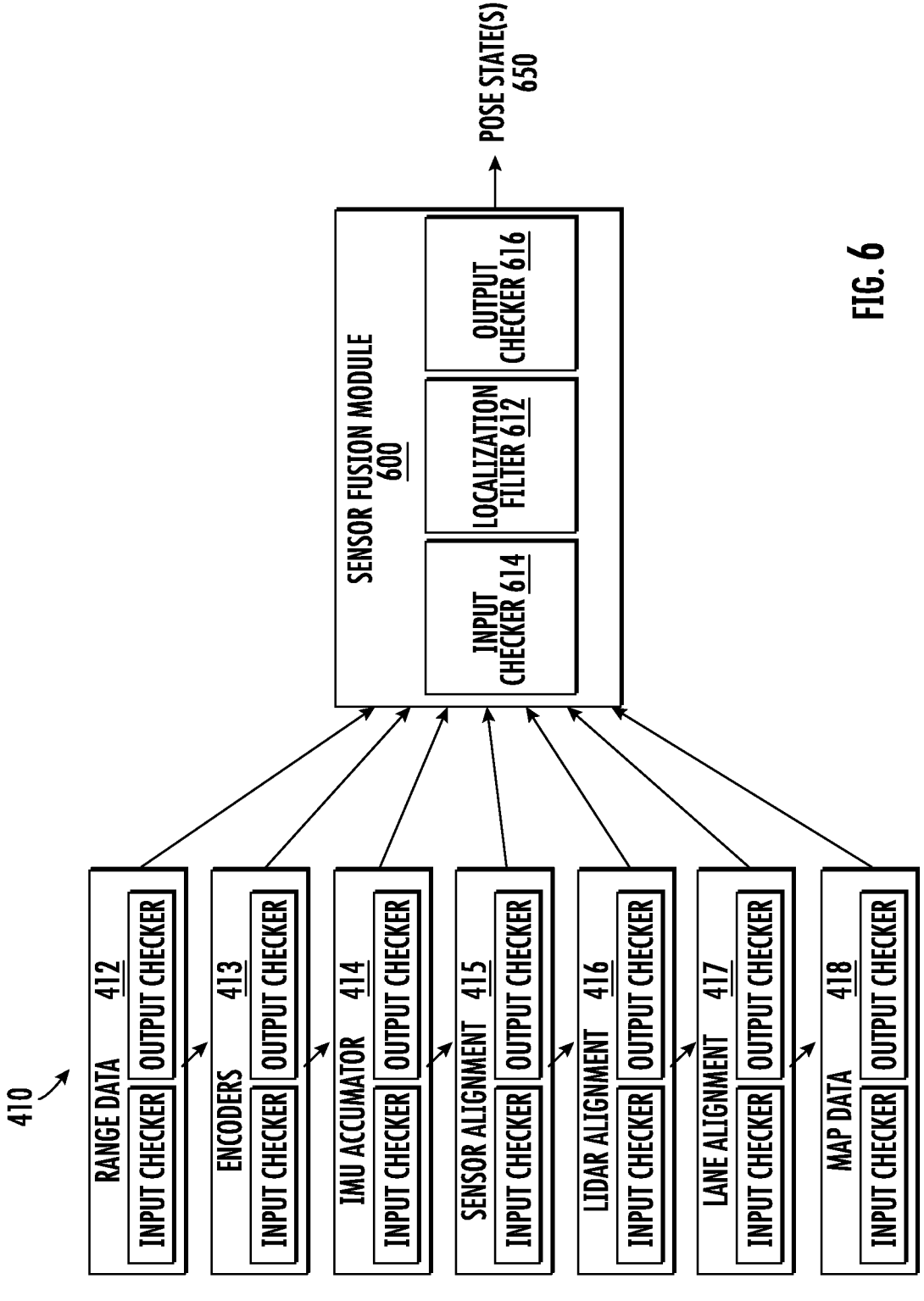
FIG. 6 is a block diagram of an example localization system, according to some implementations of the present disclosure.

FIG. 6 is a block diagram of an autonomous vehicle control system 600, according to some implementations of the present disclosure. The autonomous vehicle control system 600 can include a localization system 610. The localization system 610 can include a localization filter 612. The localization system 610 can receive inputs from various systems, such as lane alignment module 620 and surfel registration module 630, and produce pose state estimates of an autonomous vehicle, such as local pose state 652 and global pose state 654.

The autonomous vehicle control system 600 can include input and output checks at multiple levels. For instance, the localization system 610 can include an input checker 614 and an output checker 616. The input checker 614 and output checker 616 can provide independent detection of anomalous inputs or outputs for a respective module. Additionally or alternatively, the lane alignment module 620 can include an output checker 625. The output checker 625 can be configured to detect abnormal outputs from the lane alignment module 620. As one example, if the lane alignment output is inaccurate due to LIDAR occlusion or other condition, the output checker 625 can flag or gate outputs from the lane alignment module 620. Additionally or alternatively, the surfel registration module 630 can include an output checker 635. The output checker 635 can be configured to detect abnormal outputs from the surfel registration module 630. As one example, if the surfel registration output is inaccurate due to LIDAR occlusion, vegetation mismatch, etc., the output checker 635 can flag or gate outputs from the surfel registration module 630.

Additionally, the input checker 614 can gate inputs received by the localization system 610. For instance, even if an abnormal input was not detected by the output checkers 625 or 635, the input checker 614 can independently evaluate whether an input is valid and gate the input if invalid. For instance, in some implementations, if the input checker 614 determines that multiple systems have provided abnormal output, the input checker 614 can initiate a recovery protocol, such as stopping the autonomous vehicle. Therefore, the autonomous vehicle control system 600 includes checks at multiple layers, which can provide a system with significantly improved robustness. This can be especially beneficial in cases where abnormalities are primarily independent and do not spread across multiple modules.

Figure 7:
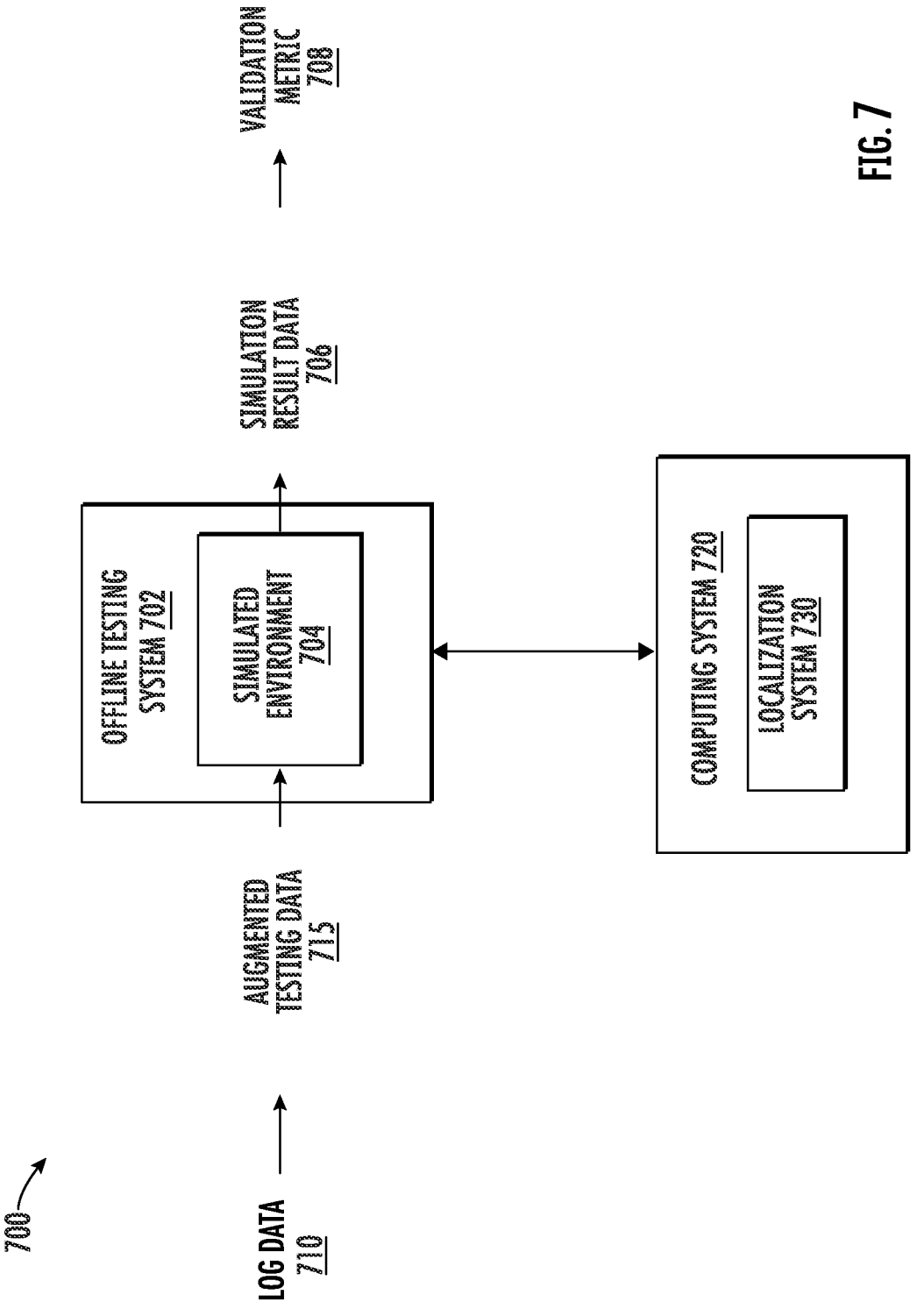
FIG. 7 is a block diagram of an example computing environment, according to some implementations of the present disclosure.

FIG. 7 is a block diagram of a computing environment 700, according to some implementations of the present disclosure. The example computing environment 700 can include an offline testing system 702 that validates a localization system 730 using augmented testing data 715. In particular, the offline testing system 702 can determine a metric 708 associated with the localization system 730. The metric 708 can be indicative of a performance of the localization system, such as a failure rate of the localization system. In some implementations, the failure rate may be associated with the occurrence of an anomaly. As described herein, an anomaly may occur, for example, in the event the localization system does not localize the associated autonomous vehicle, does not localize the autonomous vehicle within a threshold confidence. Additionally, or alternatively, an anomaly may occur in cases where a system (e.g., a subsystem of the vehicle, localization system) fails to produce an output or produces an output with an insufficiently high confidence.

In some implementations, the offline testing system 702 can be a separate computing system from the computing system 720 which includes the localization system 730. For instance, in some implementations, the offline testing system 702 can communicate with the computing system 720 (e.g., via one or more networks) to validate the localization system 730 while the localization system 730 is onboard the computing system 720. Alternatively, in some implementations, the localization system 730 can be validated while stored on the offline testing system 702. For instance, the localization system 730 can be simulated in the offline testing system 702 or the computing system 720.

The offline testing system 702 can obtain log data 710. The log data 710 can be captured during operation of a real-world autonomous vehicle. For instance, a vehicle, such as an autonomous vehicle, may record data captured by its sensors or sensor data processing modules (e.g., lane alignment, surfel registration, etc.) and/or localization outputs such as local pose or global pose as it moves throughout its environment. Accordingly, the offline testing system can perform the validation of a module-by-module basis or of the entire location system 730 as a whole.

Data captured by one or more autonomous vehicles can be compiled into a corpus of log data 710. Generally, the log data 710 depicts real-world operational conditions as observed by the autonomous vehicles. For instance, the operational conditions can include weather conditions, construction conditions, occlusions, light levels, traffic conditions, and so on.

Although the log data 710 can depict a wide variety of operational conditions, the data captured from real-world examples may include a lower than desirable amount of data depicting operational conditions, such as, for example, concurrent wet ground conditions, intense occlusion from precipitation, and satellite disruption from atmospheric conditions. For instance, it may be desirable to test these operational conditions in greater proportion than they occur in the real world and, consequently, appear in log datasets based on real-world data 710. Although the log data 710 is illustrated as separate from the offline testing system 702 in FIG. 7, the log data 710 can be stored at the offline testing system 702, the computing system 720, or in any other suitable location without deviating from the present disclosure.

The offline testing system 702 can provide a simulated environment 704 for assessing performance of the localization system 730. The simulated environment 704 can represent a real-world environment of an autonomous vehicle employing the localization system 730. For instance, the simulated environment 704 may provide inputs to the localization filter 730 as if those inputs were obtained from sensors or systems in a real-world environment, such as any of the sensors or systems depicted in FIGS. 4 through 6 (e.g., the lane alignment module 526, the sensor velocity module 514, the surfel registration model 528, the output checker(s) 615, 616, 625, or other suitable sensors or systems).

Although the offline testing system 702 can test performance of the localization system 730 using only the log data 710, the offline testing system 702 can generate augmented testing data 715 for validating the localization system 730. In particular, the offline testing system 702 can generate the augmented testing data 715 by augmenting the log data 710 with one or more simulated anomalies. The one or more simulated anomalies can provide for simulated data depicting rare operational conditions that are not necessarily present or frequent in the set of log data 710. For instance, the one or more simulated anomalies can include artificially degrading or disabling operation of various systems throughout the testing process, such as by injecting noise, disruption, or other degradations into the log data 710.

The offline testing system 702 can provide the augmented testing data 715 as input to the localization system 730 in the simulated environment 704 to test the localization system 730. During and after testing the localization system 730, the offline testing system 702 can generate simulation result data 706. The simulation result data 706 can be descriptive of a state of the localization system 730 during or subsequent to simulating operation of the localization system 730 in the simulated environment 704. In some implementations, the simulation result data 706 can be descriptive of one or more anomalous outputs of the localization system 730. For instance, the offline testing system 702 can record simulation result data 706 associated with one or more testing instances. The simulation result data 706 can include any suitable data descriptive of states or outputs of the localization system 730 for each testing instance, such as, for example, output values, state data, occurrences of warnings, errors, or anomalous operation of the localization system 730. As one example, the simulation result data 706 can record any occurrence of interventions resulting from unreliable output of the localization system 730 or output that is inconsistent with the augmented testing data 715, the simulated environment 704, and/or other simulated systems of a larger simulated autonomous vehicle control system.

The offline testing system 702 can then determine a metric 708 associated with the localization system 730 as a whole (or any subsystem or module of the localization system 730) based on the simulation result data 706. The metric 708 can represent an inconsistency rate or metric of the localization system 730 or module over the augmented testing data 715, including the simulated anomalies. For example, the metric 708 can be or can include a number of autonomy disengagements or outputs inconsistent with input data or other systems that occurred over the examples in the augmented testing data 715. In some implementations, the metric 708 can represent a validation confidence associated with the localization system 730. As an example, the metric 708 can be indicative of whether the localization system 730 localized the autonomous vehicle (e.g., within the simulated environment 704) with a threshold confidence. For instance, a high validation confidence (e.g., above a threshold) can represent a successfully validated localization system 730. As another example, a zero metric can represent a successfully validated localization system 730. The zero metric can be indicative of a zero anomaly rate (e.g., no detections of events where the localization system did not localize the associated vehicle or did not localize within a threshold confidence, no detection of events where a system failed to produce an output or produced an output with an insufficiently high confidence).

FIG. 8 is a flowchart of a method 800 for validating a localization system of an autonomous vehicle, according to some implementations of the present disclosure. One or more portion(s) of the method 800 can be implemented by a computing system that includes one or more computing devices such as, for example, the computing systems described with reference to the other figures (e.g., as in FIGS. 1, 2, 4-7, 10, etc.). Each respective portion of the method 800 can be performed by any (or any combination) of one or more computing devices. Moreover, one or more portion(s) of the method 800 can be implemented on the hardware components of the device(s) described herein (e.g., as in FIGS. 1, 2, 4-7, 10, etc.), for example, to validate one or more systems or models.

FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems. As one example, one or more portions of method 800 can be performed by an offline testing system.

The method 800 can include, at 802, obtaining log data descriptive of a plurality of environmental and operational conditions associated with operation of the autonomous vehicle in an environment. The log data can be captured during operation of a real-world autonomous vehicle. For instance, a vehicle, such as an autonomous vehicle, may record data captured by its sensors or sensor data processing modules (e.g., lane alignment, surfel registration, etc.) as it moves throughout its environment. Data captured by one or more autonomous vehicles can be compiled into a corpus of log data. The log data can include localization result data descriptive of an output or state of the localization system during operation of the autonomous vehicle in the environment.

In an example, the log data depicts real-world operational conditions as observed by the autonomous vehicles. For instance, the operational conditions can include weather conditions, construction conditions, occlusions, light levels, traffic conditions, and so on. Although the log data can depict a wide variety of operational conditions, the data captured from real-world examples may include a lower than desirable amount of data depicting rarer operational conditions, such as, for example, concurrent wet ground conditions, intense occlusion from precipitation, and satellite disruption from atmospheric conditions.

The method 800 can include, at 804, augmenting the log data with one or more simulated anomalies. The one or more simulated anomalies can provide for simulated data depicting operational conditions that are not necessarily present or frequent in the set of log data. For instance, the one or more simulated anomalies can include artificially degrading or disabling operation of various systems throughout the testing process, such as by injecting noise, disruption, or other degradations into the log data. In some implementations, the one or more simulated anomalies can include one or more simulated dropped inputs. In some implementations, the one or more simulated anomalies can include one or more simulated degraded inputs.

The simulated anomalies can be generated in a variety of manners. They can be introduced manually (e.g., by human user input through a user interface) or automatically by a computing system. Instances of data including the simulated anomalies can be included as new, additional examples in the log dataset. Alternatively, the examples having the simulated anomalies can replace the original examples that the simulated anomalies are based on. In some implementations, a simulated anomaly can be included by augmenting a system or its associated datasets/outputs with additional data that introduces noise or otherwise distorts or removes portions of the associated datasets/outputs that would otherwise be present. For example, simulated anomalies can include augmented map data, such as map data including out-of-date data, data from the wrong season or weather conditions, map data including new construction or previous construction, new lane lines, vegetation growth, or other anomalous map data. Additionally or alternatively, simulated anomalies can include missing ranging data such as missing LIDAR, RADAR, or other ranging data due to inclement weather, sensor occlusion or obstruction, sensor malfunction, etc. Additionally or alternatively, simulated anomalies can include degraded inputs such as noisy inputs, dropped sensors, sensor miscalibration, or other suitable degraded inputs.

In some implementations, log data can be selected by a developer. For instance, the developer can select testing examples that depict interesting or particularly challenging operational conditions. As another example, the testing examples can be selected procedurally. For instance, a simulated anomaly can be injected at some regular interval, or by some other procedural approach. As another example, the testing examples can be selected randomly. Augmenting the log data can additionally include selecting one or more simulated anomalies to include in the selected testing examples. In some cases, multiple simulated anomalies can be injected into the same testing example. In some implementations, the simulated anomalies can be selected or designed by a developer. In some implementations, the simulated anomalies can be selected procedurally or randomly.

The method 800 can include, at 806, simulating operation of the localization system using the augmented data as input. For instance, in some implementations, an offline testing system can provide a simulated environment for the localization system. The simulated environment can represent a real-world environment of an autonomous vehicle employing the localization system. For instance, the simulated environment may use log data as if the data were obtained from sensors in a real-world environment. The log data can include localization result data descriptive of an output or state of the localization system during operation of the autonomous vehicle in the environment. Additionally or alternatively, the offline testing system may bypass some sensor processing modules by providing log data that simulates outputs from the sensor processing modules. As one example, in some implementations, the offline testing system can provide log data including simulated sensor data to sensor processing modules. The sensor processing modules can then provide inputs to the localization system, based on the simulated sensor data. In this manner, the localization system can be tested along with relevant modules in an end-to-end manner. Additionally or alternatively, the localization system can be tested directly by providing log data including simulated outputs from the sensor processing modules as inputs directly to the localization system.

In some implementations, simulating operation of the localization system using the augmented data as input can include dropping one or more inputs to the localization system. The one or more inputs can include outputs of any one or more of a lane alignment system, a surfel registration system, a sensor velocity system, an IMU, one or more wheel encoders, a GNSS, a RADAR system, or a LIDAR system, or other suitable inputs. For instance, the offline testing simulation can drop inputs to simulate abnormal operating conditions such as unreliable outputs from upstream modules, gated or inconsistent inputs (e.g., by an output checker), sensors dropping out, communication disruption, and so on.

In some implementations, simulating operation of the localization system using the augmented data as input can include degrading one or more inputs to the localization system. Degrading one or more inputs to the localization system can include: disabling outputs of one or more sensors in a sensor system; utilizing one or more incorrect calibrations on a sensor; simulating one or more occlusions; simulating latency at the one or more inputs; simulating one or more boundary conditions; injecting a checkpoint fault; or any other suitable degradation of input quality. The degraded inputs can simulate harsher operating conditions than the real-world examples the augmented examples are based on.

In some implementations, simulating operation of the localization system using the augmented data as input can include augmenting map data provided to the localization system. For instance, the augmented map data can include one or more simulated anomalies in the map data. As examples, the augmented map data can include one or more of out-of-date map data, map data representing new construction or vegetation, misaligned map data, map data comprising missing surfel registrations, or map data depicting inaccurate travelway regions. The augmented map data can be sourced from previously valid map data that has become outdated, manually modified map data, such as map data manually assigned to an incorrect geographic coordinate, or other suitable sources.

In some implementations, simulating operation of the localization system using the augmented data as input can include initially simulating operation of the localization system using the original log data, lacking the simulated anomalies, as input. The system can then progress to using the augmented data including the simulated anomalies as input. An example depicting this process is described with respect to method 900 of FIG. 9.

The method 800 can include, at 808, obtaining simulation result data descriptive of a state of the localization system subsequent to simulating operation of the localization system. In some implementations, the simulation result data can be descriptive of one or more anomalous outputs of the localization filter. For instance, the offline testing system can record simulation result data associated with one or more testing instances. The simulation result data can include any suitable data descriptive of states or outputs of the localization system for each testing instance, such as, for example, output values, state data, occurrences of warnings, errors, or anomalous operation of the localization system or components of the autonomous vehicle control system, or any other suitable data. As one example, the simulation result data can record any occurrence of autonomy disengagements resulting from inconsistent or unreliable output of the localization system.

The method 800 can include, at 810, determining a metric associated with the localization system based on the simulation result data. The metric can represent an inconsistency rate or metric of the localization system over the log data, including the simulated anomalies. For example, the metric can be or can include a number of autonomy disengagements or inconsistent outputs that occurred over the examples in the log data. As one example, in some implementations, the log data includes localization result data descriptive of an output or state of the localization system during operation of the autonomous vehicle in the environment and determining the metric associated with the localization system is based on a comparison between the localization result data and simulation result data. In some implementations, the metric can represent a validation confidence associated with the localization system. As an example, the metric can be indicative of whether the localization system localized the autonomous vehicle (e.g., within the simulated environment) with a threshold confidence.

In some implementations, determining a metric associated with the localization system is based on one or more metrics associated with subsystems of the localization system, such as other modules, inputs, etc. Thus, determining a metric associated with the localization system can include determining one or more subsystem metrics associated with one or more subsystems of the localization system and determining the metric associated with the localization filter based on the one or more subsystem metrics. The validation confidence associated with the localization system can, for example, be based on confidences associated with the subsystems. As one example, the validation confidence may be based on a combined probability that each subsystem generates incorrect data, their respective output checkers fail to detect the incorrect data, the localization system (e.g., the localization filter) fails to detect the incorrect problem, the localization system does not localize the vehicle (e.g., at all or within a threshold confidence), an output is not produced (e.g., at all or within a threshold confidence), etc.

In some implementations, the metric can be determined based on one or more statistical correlations learned through simulation of localization scenarios. For instance, in some cases, simulation of localization scenarios over sizable amounts of log data can reveal previously-unknown statistical correlations between aspects of the log data. Thus, simulation result data or metrics associated with multiple validated localization systems can be analyzed (e.g., by pattern recognition algorithms) to highlight statistical correlations. These correlations can be used to produce models used in determining the metric associated with the localization system.

The method 800 can optionally include, at 812, determining that the metric associated with the localization filter satisfies a threshold. The method 800 can optionally include, in response to determining that the metric associated with the localization filter satisfies the threshold, validating the localization filter. For instance, in some implementations, the metric can be compared to a threshold representing an acceptable metric for validating the localization filter. As one example, the threshold may represent an acceptable anomaly rate tolerance for the localization system. The threshold may be set by regulations, industry standard, etc. In some implementations, the threshold may be a zero threshold (e.g., representing no anomalous operation in any of the log data). In some implementations, a threshold may be considered satisfied in the event that the threshold is met or exceeded. In some implementations, a threshold (e.g., a desired upper limit) may be considered satisfied in the event the threshold is not exceeded.

FIG. 9 is a flowchart of an example method 900 for validating a localization system of an autonomous vehicle, according to some implementations of the present disclosure. One or more portion(s) of the method 900 can be implemented by a computing system that includes one or more computing devices such as, for example, the computing systems described with reference to the other figures (e.g., as in FIGS. 1, 2, 4-7, 10, etc.). Each respective portion of the method 900 can be performed by any (or any combination) of one or more computing devices. Moreover, one or more portion(s) of the method 900 can be implemented on the hardware components of the device(s) described herein (e.g., as in FIGS. 1, 2, 4-7, 10, etc.), for example, to validate one or more systems or models.

FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

The method 900 can include, at 902, testing, in one or more first testing instances, a localization system using log data. For instance, in some implementations, an offline testing system can provide a simulated environment for the localization system. The simulated environment can represent a real-world environment of an autonomous vehicle employing the localization system. For instance, the simulated environment may use log data simulating data that would be obtained from sensors in a real-world environment. The log data can include localization result data descriptive of an output or state of the localization system during operation of the autonomous vehicle in the environment. Additionally or alternatively, the offline testing system may bypass some sensor processing modules by providing log data that simulates outputs from the sensor processing modules. As one example, in some implementations, the offline testing system can provide log data including simulated sensor data to sensor processing modules. The sensor processing modules can then provide inputs to the localization system, based on the simulated sensor data. In this manner, the localization system can be tested along with relevant modules in an end-to-end manner. Additionally or alternatively, the localization system can be tested directly by providing log data including simulated outputs from the sensor processing modules as inputs directly to the localization system.

The method 900 can include, at 904, generating first simulation result data indicating that the one or more first testing instances produce zero inconsistencies in the localization system. For instance, the offline testing system can record simulation result data associated with the first testing instances. Among other things, the simulation result data can record any anomalies or inconsistencies that occurred during the first testing instances. The offline testing system can thus determine whether any inconsistencies were produced by the first testing instances.

The method 900 can include, at 906, testing, in one or more second testing instances, the localization system using the log data augmented with the one or more simulated anomalies. For instance, the augmented data can depict more challenging or rare operational conditions which represent a higher robustness requirement for the localization system to handle without producing anomalous outputs. Thus, if the localization system passes the tests using real-world log data, that data can be augmented with simulated anomalies to further refine and validate the localization system. The system can generate second simulation result data in response to testing the localization system using the log data augmented with the one or more simulated anomalies.

The method 900 can include, at 908, providing the simulation result data including the first simulation result data or the second simulation result data. In some implementations, the simulation result data that is used to determine the metric associated with the localization system can include only the simulation result data from the second testing instances. Alternatively, in some implementations, the simulation result data used to determine the metric associated with the localization system can include the simulation result data from both the first testing instances and the second testing instances. Furthermore, in some implementations, determining the metric associated with the localization system can be based on a comparison between the first simulation result data of the one or more first testing instances and the second simulation result data of the second testing instances. For instance, in some implementations, the comparison can include whether the metric is less satisfactory with respect to the second testing instances.

Figure 10:
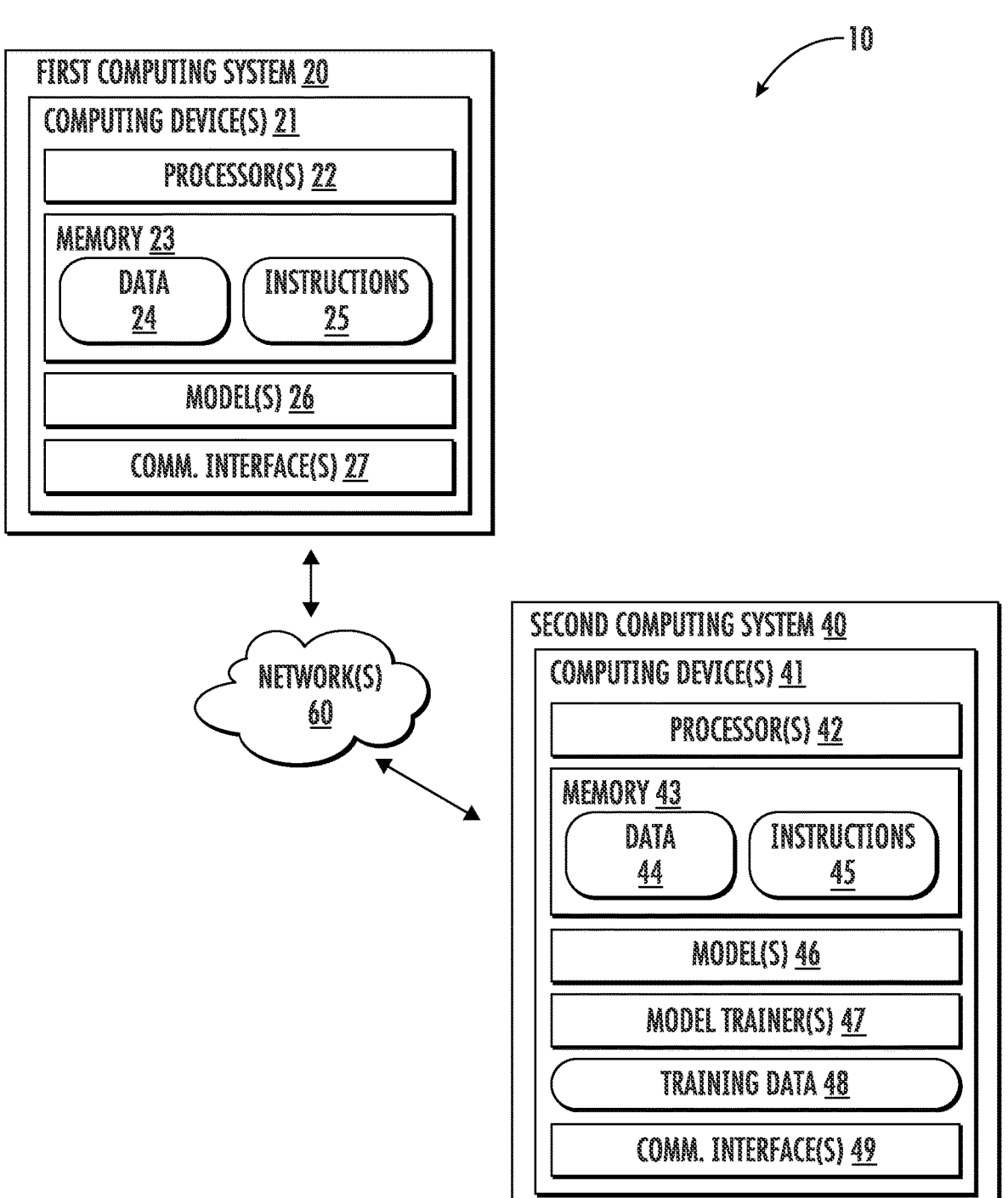
FIG. 10 is a block diagram of an example computing system for localizing an autonomous vehicle, according to some implementations of the present disclosure.

FIG. 10 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system(s) 160, the onboard computing system(s) 180, the autonomy system(s) 200, localization system 230, 400, 502, 610, 730, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 can not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, testing data, log data, metrics, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 10 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 can not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method for validating a localization system of an autonomous vehicle, comprising:
(a) obtaining log data descriptive of a plurality of environmental and operational conditions associated with operation of the autonomous vehicle in an environment;
(b) augmenting the log data with one or more simulated anomalies;
(c) simulating operation of the localization system using the augmented data as input;
(d) obtaining simulation result data descriptive of a state of the localization system subsequent to (c); and
(e) determining a metric associated with the localization system based on the simulation result data;
wherein the metric is determined based on one or more statistical correlations learned through simulation of localization scenarios.

2. The computer-implemented method of claim 1, wherein the log data comprises localization result data descriptive of an output or state of the localization system during operation of the autonomous vehicle in the environment.

3. The computer-implemented method of claim 2, wherein determining the metric associated with the localization system is based on a comparison between the localization result data and simulation result data.

4. The computer-implemented method of claim 1, wherein (c) comprises dropping one or more inputs to the localization system.

5. The computer-implemented method of claim 4, wherein the one or more inputs comprise outputs of at least one of: (i) a lane alignment system, (ii) a surfel registration system, (iii) a sensor velocity system, (iv) an IMU, (v) one or more wheel encoders, (vi) a GNSS, (vii) a RADAR system, or (viii) a LIDAR system.

6. The computer-implemented of claim 1, wherein (c) comprises disabling at least one of: (i) a lane alignment system, (ii) a surfel registration system, (iii) a sensor velocity system, (iv) an IMU, (v) one or more wheel encoders, (vi) a GNSS, (vii) a RADAR system, or (viii) a LIDAR system.

7. The computer-implemented method of claim 1, wherein (c) comprises degrading one or more inputs to the localization system.

8. The computer-implemented method of claim 7, wherein degrading one or more inputs to the localization system comprises at least one of: (i) disabling outputs of one or more sensors in a sensor system; (ii) utilizing one or more incorrect calibrations on a sensor; (iii) simulating one or more occlusions; (iv) simulating latency at the one or more inputs; (v) simulating one or more boundary conditions; or (vi) injecting a checkpoint fault.

9. The computer-implemented method of claim 1, wherein (c) comprises augmenting map data provided to the localization system.

10. The computer-implemented method of claim 9, wherein the augmented map data comprises one or more of out-of-date map data, map data representing new construction or vegetation, misaligned map data, map data comprising missing surfel registrations, or map data depicting inaccurate travelway regions.

11. The computer-implemented method of claim 1, wherein the simulation result data is descriptive of one or more anomalous outputs of the localization filter.

12. The computer-implemented method of claim 1, wherein (e) comprises:

determining one or more subsystem metrics associated with one or more subsystems of the localization system; and determining the metric associated with the localization filter based on the one or more subsystem metrics.

13. The computer-implemented method of claim 1, wherein the metric is indicative of whether the localization system localized the autonomous vehicle with a threshold confidence.

14. The computer-implemented method of claim 1, wherein the method further comprises:

(f) determining that the metric associated with the localization filter satisfies a threshold; and (g) in response to determining that the metric associated with the localization filter satisfies the threshold, validating the localization filter.

15. An autonomous vehicle control system, comprising:

one or more processors; and one or more non-transitory, computer-readable media storing instructions that cause the one or more processors to perform operations comprising:

(a) obtaining log data descriptive of a plurality of environmental and operational conditions associated with operation of the autonomous vehicle in an environment;

(b) augmenting the log data with one or more simulated anomalies;

(c) simulating operation of the localization system using the augmented data as input;

(d) obtaining simulation result data descriptive of a state of the localization system subsequent to (c); and (e) determining a metric associated with the localization system based on the simulation result data;

wherein the metric is determined based on one or more statistical correlations learned through simulation of localization scenarios.

16. The autonomous vehicle control system of claim 15, wherein the log data comprises localization result data descriptive of an output or state of the localization system during operation of the autonomous vehicle in the environment.

17. The autonomous vehicle control system of claim 16, wherein determining the metric associated with the localization system is based on a comparison between a result of one or more first testing instances and the simulation result data.

18. The autonomous vehicle control system of claim 15, wherein (c) comprises dropping one or more inputs to the localization system, wherein the one or more inputs comprise outputs of at least one of: (i) a lane alignment system, (ii) a surfel registration system, (iii) a sensor velocity system, (iv) an IMU, (v) one or more wheel encoders, (vi) a GNSS, (vii) a RADAR system, or (viii) a LIDAR system.

19. An autonomous vehicle, comprising:

one or more processors; and one or more non-transitory, computer-readable media storing instructions that cause the one or more processors to perform operations comprising:

(a) obtaining log data descriptive of a plurality of environmental and operational conditions associated with operation of the autonomous vehicle in an environment;

(b) augmenting the log data with one or more simulated anomalies;

(c) simulating operation of the localization system using the augmented data as input;

(d) obtaining simulation result data descriptive of a state of the localization system subsequent to (c); and (e) determining a metric associated with the localization system based on the simulation result data;

wherein the metric is determined based on one or more statistical correlations learned through simulation of localization scenarios.

20. The autonomous vehicle of claim 19, wherein the log data comprises localization result data descriptive of an output or state of the localization system during operation of the autonomous vehicle in the environment.

\* \* \* \* \*